US012131312B2

(12) United States Patent
Faulk et al.

(10) Patent No.: US 12,131,312 B2
(45) Date of Patent: Oct. 29, 2024

(54) INTEGRATED SUPPLIER NETWORKS

(71) Applicant: JPMORGAN CHASE BANK, N.A., New York, NY (US)

(72) Inventors: Catherine D. Faulk, Mickleton, NJ (US); Matthew C. Taylor, Powell, OH (US); Christine Moy, New York, NY (US); George Kassis, London (GB); Tyrone Lobban, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 146 days.

(21) Appl. No.: 17/317,502

(22) Filed: May 11, 2021

(65) Prior Publication Data

US 2021/0350358 A1    Nov. 11, 2021

Related U.S. Application Data

(60) Provisional application No. 63/022,827, filed on May 11, 2020.

(51) Int. Cl.
*G06Q 20/36* (2012.01)
*G06Q 10/0835* (2023.01)
(Continued)

(52) U.S. Cl.
CPC ..... *G06Q 20/3674* (2013.01); *G06Q 10/0835* (2013.01); *G06Q 20/3821* (2013.01);
(Continued)

(58) Field of Classification Search
None
See application file for complete search history.

(56) References Cited

U.S. PATENT DOCUMENTS 11,514,488 B1\* 11/2022 Rawal ................. G06F 16/9535
2002/0144110 A1\* 10/2002 Ramanathan ......... H04L 9/3263
713/156
(Continued)

OTHER PUBLICATIONS

Hossain, Safaet, Cryptography Based Trust Models for Electronic Data Interchange (EDI), Dec. 2015, ITEE Journal, vol. 4, Issue 6, p. 1-7 (Year: 2015).\*

(Continued)

*Primary Examiner* — Neha Patel
*Assistant Examiner* — Nicholas K Phan
(74) *Attorney, Agent, or Firm* — GREENBERG TRAURIG LLP

(57) ABSTRACT

According to another embodiment, a method for invoicing and payments in an integrated supplier network may include: (1) receiving, at a supplier interface for a payments computer program, an invoice from a supplier; (2) receiving, at a buyer interface for the payments computer program, a payment allocation for the invoice, wherein the payment allocation may be associated with a supplier attestation for the supplier; (3) transferring, by the payments computer program, funds for the payment allocation to a liquidity pool, wherein the funds are commingled with other funds in the liquidity pool; (4) receiving, at the supplier interface, the supplier attestation, and a request to withdraw at least a portion of the funds for the payment allocation; and (5) retrieving, by the payments computer program, the portion of the payment allocation to a supplier account with the integrated supplier network.

8 Claims, 5 Drawing Sheets

(51) Int. Cl.
    *G06Q 20/38*    (2012.01)
    *G06Q 20/40*    (2012.01)
    *G06Q 20/42*    (2012.01)

(52) U.S. Cl.
    CPC ......... *G06Q 20/389* (2013.01); *G06Q 20/401* (2013.01); *G06Q 20/42* (2013.01)

(56) References Cited

U.S. PATENT DOCUMENTS

| | | | | |
|---|---|---|---|---|
| 2003/0130938 A1* | 7/2003 | Wolfston, Jr. | ......... | G06Q 20/10 705/39 |
| 2007/0061260 A1* | 3/2007 | deGroeve | ............. | G06Q 20/10 705/44 |
| 2009/0132813 A1* | 5/2009 | Schibuk | ............ | G06Q 20/4014 726/9 |
| 2014/0279098 A1* | 9/2014 | Ham | ................... | G06Q 20/102 705/16 |
| 2020/0167768 A1* | 5/2020 | Mahaffey | ........... | G06Q 30/0236 |
| 2021/0133705 A1* | 5/2021 | Iyer | ...................... | G06Q 20/108 |
| 2022/0261798 A1* | 8/2022 | Wright | ................ | G06Q 20/065 |

OTHER PUBLICATIONS

International Search Report, dated Aug. 18, 2021, from corresponding International Application No. PCT/JS2021/031809.

Written Opinion of the International Searching Authority, dated Aug. 18, 2021, from corresponding International Application No. PCT/US2021/031809.

Aydar, Mehmet, et al.; "Towards a Blockchain based digital identity verification, record attestation and record sharing system", arxiv.org, Cornell University Library, 201 Olin Library Cornell University Ithaca, NY 14853, Jun. 24, 2019 (Jun. 24, 2019), XP081379465.

* cited by examiner

INTEGRATED SUPPLIER NETWORKS

RELATED APPLICATIONS

This application claims priority to, and the benefit of, U.S. Provisional Patent Application Ser. No. 63/022,827, filed May 11, 2020, the disclosure of which is hereby incorporated, by reference, in its entirety.

BACKGROUND OF THE INVENTION

1. Field of the Invention

Embodiments relate generally to integrated supplier networks.

2. Description of the Related Art

Organizations often use suppliers. To pay these suppliers, they set up and maintain the supplier reference data, including highly confidential banking details, tax ID numbers, remittance addresses, and other additional data points. The time required to set up these suppliers is time consuming and costly, and the maintenance is constant as bank details, contacts and addresses change frequently. To complicate matters, suppliers often use more than one bank account, and submit invoices identifying a specific bank account for payments. This effectively requires the organization to allocate funds to the supplier. If the wrong bank details are identified, the accounts payable team will often need to research and rectify the issue.

SUMMARY OF THE INVENTION

Integrated supplier network and payment platforms are disclosed. In one embodiment a method for supplier onboarding a supplier in an integrated supplier network may include: (1) claiming, by a supplier using a supplier electronic device, an attestation for the supplier from an identity provider; (2) storing, by the supplier using the supplier electronic device, the attestation in a supplier electronic wallet; and (3) providing, by the supplier using the supplier electronic device, the attestation to a buyer electronic device. The buyer electronic device may be configured to verify the attestation with a distributed ledger network and onboard the supplier for payments following verification.

In one embodiment, the attestation may include a legal entity identifier for the supplier, a certificate of incorporation for the supplier, etc.

In one embodiment, the supplier and the buyer are participants in a distributed ledger network.

In one embodiment, the step of providing the attestation to the buyer electronic device may include: presenting, in a portal presented by the supplier electronic device, a plurality of buyers for selection; receiving, in the portal executed by the supplier electronic device, a selection of the buyer; presenting, in the portal presented by the supplier electronic device, a plurality of attestations for selection; and receiving, in the portal executed by the supplier electronic device, a selection of the attestation.

In one embodiment, the buyer electronic device may be configured to retrieve supplier information from an enterprise resource planning system.

According to another embodiment, a method for invoicing and payments in an integrated supplier network may include: (1) receiving, at a supplier interface for a payments computer program, an invoice from a supplier; (2) receiving, at a buyer interface for the payments computer program, a payment allocation for the invoice, wherein the payment allocation may be associated with a supplier attestation for the supplier; (3) transferring, by the payments computer program, funds for the payment allocation to a liquidity pool, wherein the funds are commingled with other funds in the liquidity pool; (4) receiving, at the supplier interface, the supplier attestation, and a request to withdraw at least a portion of the funds for the payment allocation; and (5) retrieving, by the payments computer program, the portion of the payment allocation to a supplier account with the integrated supplier network.

In one embodiment, the invoice may be signed with an invoicing attestation for an employee of the supplier. The invoicing attestation may attest that the employee of the supplier is authorized to submit invoices for the supplier.

In one embodiment, the payment allocation may be signed with an authorized payer attestation for an employee of the supplier. The authorized payer attestation may attest that the employee of the buyer is authorized to issue payments for the buyer.

In one embodiment, the invoice may include a completion progress attestation issued by the buyer to the supplier. The completion progress attestation may attest to a completion progress by the supplier.

In one embodiment, the method may further include determining, by the payments computer program, a dynamic discount amount for the portion of the funds for the payment allocation, wherein the dynamic discount may be based on a timing of the retrieval by the supplier.

In one embodiment, the supplier account with the integrated supplier network may include a digital wallet.

In one embodiment, the funds may be provided in ERC20 tokens.

In one embodiment, the payment allocation may be based on an amount of the invoice and a timing of the retrieve of the portion of the funds for the payment allocation.

In one embodiment, the supplier attestation may include a legal entity identifier for the supplier, a certificate of incorporation for the supplier, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
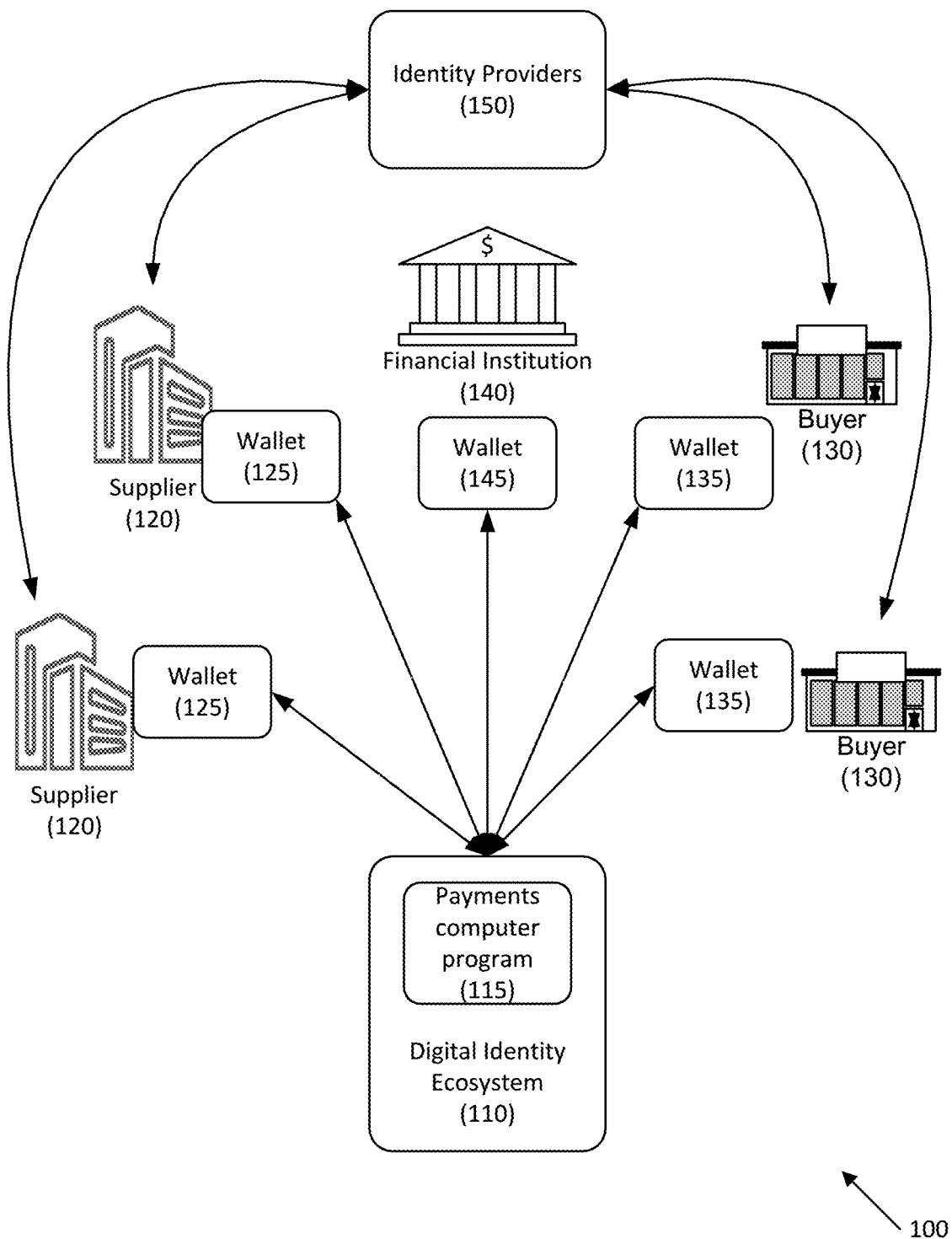
FIG. 1 depicts an integrated supplier network and payment platform according to one embodiment.

Embodiments relate generally to integrated supplier network and payment platforms.

In embodiments, an integrated supplier network and payment platform may include a network side and a payment side. The network side provides an easy, secure platform for suppliers to log in and complete their own updates to their details. The payment side facilitates the use of a "holding account" where approved money for payments (co-mingled) may be stored. Payment methods, such as card payments, dynamic discounts, etc., may be offered. Suppliers may be provided with a token that may include their details and the amount of money they have been approved to draw down. The suppliers may then collect that money from the holding account, and they are responsible for sending that money to the bank account of their choice and doing their own allocation and accounting.

Embodiments may eliminate the need for the institution to "push" funds into supplier bank accounts—potentially thousands of bank accounts across the world. Instead, the suppliers "pull" the money from the holding account. Thus, the institution does not need the suppliers' banking details. Other authentication factors, or combinations thereof, may be used.

Embodiments provide a gateway in which suppliers may electronically submit invoices through one central portal, while selecting dynamic payment terms that fit the requirements of their business. Payment may be made by ACH, credit card (e.g., single use accounts), QuickPay, crypto currency, etc.

An example of cryptocurrency is disclosed in U.S. Patent Application Ser. No. 62/962,021, the disclosure of which is hereby incorporated, by reference, in its entirety.

Embodiments may be used for complex relationships or for simple, one-time transactions. The portal may provide suppliers with additional information regarding their status as a supplier (e.g., invoices/receivables outstanding).

Embodiments may provide a supplier directory, where suppliers may register both their company information and commercial capabilities. This directory helps to both mitigate fraud, serving as a source for banking services information and payment details, while enabling fast and efficient payment processing.

In embodiments, suppliers may share their attestations (e.g., a tax attestation, a certificate of incorporation attestation, a Legal Entity identifier (LEI) attestation, etc.) with buyers. Embodiments may not provide a centralized directory of information; instead, supplier information (e.g., data points) may be owned and stored with that supplier.

In embodiments, if a supplier is unsure of the best payment option for them, the gateway may include smart logic that may assess the supplier's profile information and recommend option(s) to them on how best to optimize their accounts receivable. For example, advanced application program interfaces (API's) may be used.

In one embodiment, discounting services, such as dynamic discounting, may be provided. Dynamic discounting may describe payment terms between a buyer and supplier to accelerate payment in return for a discount. The discount may vary according to the date of early payment, so that the earlier the payment, the greater the discount. Dynamic discounting may be facilitated by storing discounts centrally with the facilitator and time stamping the activities between invoicing and when a payment clears. Examples of dynamic discounting systems, methods and techniques that may be used are disclosed in U.S. Pat. Nos. 8,108,296; 8,478,637; and 8,554,673; and U.S. patent application Ser. Nos. 13/904,663; 13/794,018; and Ser. No. 13/893,769. The disclosures of each of these patents and patent applications is hereby incorporated by reference in its entirety.

Referring to FIG. 1, an integrated supplier network and payment platform is disclosed according to an embodiment. System 100 may include Digital Identity ecosystem 110, which may be provided on a server (e.g., cloud-based and/or physical), a workstation, a computer (e.g., desktop, laptop, notebook, tablet, etc.). In one embodiment, Digital Identity ecosystem 110 may include payments computer program 115, which may be a computer program, an application, etc.

Payments computer program 115 may provide an interface for supplier(s) 120, buyer(s) 130, and financial institution 140 to interact. For example, supplier(s) 120, which may be suppliers of a good or service provided to buyer(s) 130, may access payments computer program 115 to onboard themselves to Digital Identity ecosystem 110 and/or one or more buyer 130.

Supplier 120 may receive attestations that supplier 120 is who supplier 120 purports to be from identity providers 150. Identity providers 150 may be entities that are authorized to issue attestations, such LEIs, authorized signer attestations, KYC attestations, authorized payor attestations, etc. Any suitable attestation may be used as is necessary and/or desired. Examples of identity providers include Local Operating Units (LOU), employers, governmental agencies, etc.

Upon receiving an attestation, buyers 130 may know with guaranteed confidence that the attestation being provided by supplier 120 is factually correct and verified because it may be backed by a chain of trust. A chain of trust occurs when one individual or entity identifies another individual or entity by authorizing them to claim an attestation using the user's email address and a one-time passphrase issued only to that individual. That individual or entity may now use that attestation to issue another attestation. By receiving the previous attestation, the individual or entity, any subsequently issued attestations build and expand on the chain of trust. For example, a new attestation may build upon a prior attestation, thereby creating the chain of trust.

Examples of attestations and identity providers are disclosed in U.S. patent application Ser. No. 17/174,650 filed Feb. 12, 2021, U.S. Provisional Patent Application Ser. No. 62/976,262 filed Feb. 13, 2020, and U.S. Provisional Patent Application Ser. No. 63/126,335 filed Dec. 16, 2020. The disclosure of each is hereby incorporated, by reference, in its entirety.

Supplier 120 may store the attestations in supplier wallet 125. In embodiments, supplier wallet 125 may include a uniform resource locator, or mobile application, etc. that may be used to claim, store and share attestations. It may further integrate with the distributed ledger and may update attestations in real time or substantially in real time. Identity provider(s) 150 may use their wallets to check attestations. Supplier wallet 125 may also be used by a verifier to check the validity and the latest status of am attestation.

In one embodiment, supplier wallet 120 may further store digital assets, ERC20 tokens, etc.

Buyer wallet 135 and financial institution wallet 145 may provide similar functionality as supplier wallet 125.

To share the attestations with one or more buyer 130, supplier 120 may provide the attestations to a portal provided by Digital Identity ecosystem 110. In another embodiment, supplier 120 may share the attestations from supplier wallet 125 to one or more buyer wallet 135. In another embodiment, supplier 120 may share the attestations via a website for the buyer. In another embodiment, supplier may share the attestations by scanning a machine-readable code (e.g., a QR code) for the buyer onboarding form or process into a mobile application. Any suitable mechanism for providing attestations for supplier 120 to one or more buyer 130 may be used as is necessary and/or desired.

Similarly, buyer 130 may receive attestations for its identity from identity providers 150 and may store those attestations in buyer wallet 135.

In one embodiment, before supplier 120 can provide its attestation(s) to one or more buyer 130, supplier may first claim the attestation from the relevant identity provider 150. Identity provider 150 may issue or otherwise make the attestation available to supplier 120. Identity provider 150 may revoke any attestation they have issued, (e.g., if identity provider 150 of Attestation A decides that supplier 120 is no longer eligible for that Attestation A). Thus, if supplier 120 shares attestation A with buyer 130, buyer's wallet 125 will show Attestation A as "revoked."

Financial institution 140 may be any financial institution with which supplier 120 or buyer may maintain an account. Examples include banks, FinTechs, etc. Each supplier 120, buyer 130, and financial institution 140 may have a wallet 125 that may store their own decentralized identities. In a decentralized world, each entity's decentralized identity uniquely identifies the entity to other entities.

In one embodiment, suppliers 120 and buyers 130 may not need to have an account with financial institution 140, but may instead hold ERC20 stable coins in their wallets 125 and 135, respectively.

Figure 2:
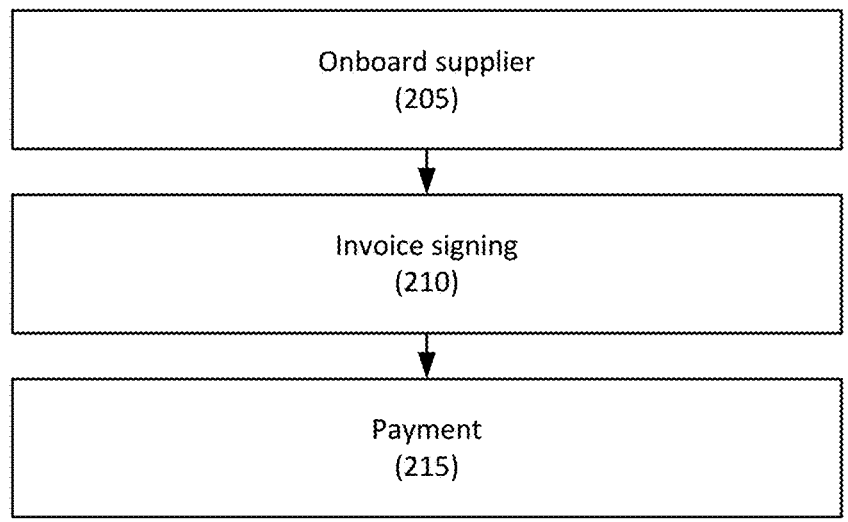
FIG. 2 illustrates a method for payments using an integrated supplier network according to one embodiment.

Referring to FIG. 2, method for payments using an integrated supplier network is disclosed according to one embodiment. In step 205, the supplier may be onboarded. In step 210, an invoice may be signed. In step 215, payment may be made. Each step will be described in additional detail with reference to FIGS. 3-5, below.

Figure 3:
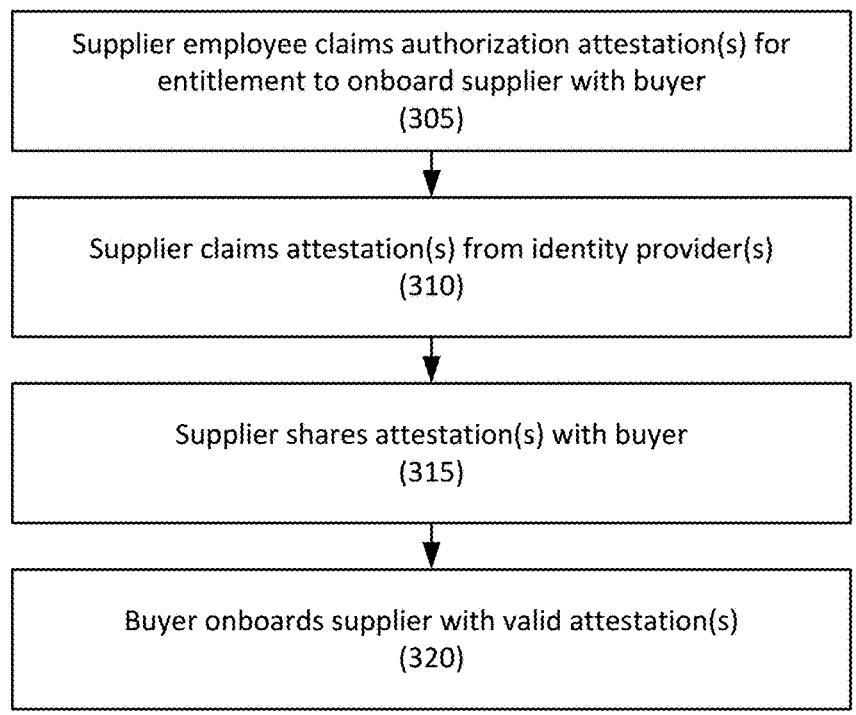
FIG. 3 illustrates a method for supplier onboarding according to one embodiment.

FIG. 3 illustrates a method for supplier onboarding is disclosed according to one embodiment. In step 305, a supplier's employee may claim an authorization attestation for an entitlement to onboard the supplier with one or more buyer. For example, the supplier may claim the authorization attestation from an authorized person or entity at the supplier.

In step 310, the supplier may claim one or more attestation(s) from an identity provider. For example, the attestation(s) may include a LEI, a certification of incorporation, etc.

In step 315, the supplier may share the attestation(s) with the buyer. For example, the supplier may select a buyer in a portal, and a window may indicate what attestation(s) from the supplier's wallet need to be shared.

In one embodiment, the attestation(s) may be reusable as long as they are valid. For example, if the supplier wants to onboard with a second buyer, it may use the same attestation (s) that it used with second supplier so long as the attestations are valid and have not expired.

In one embodiment, attestations may be re-used even if they have been expired or revoked. The recipient will be provided with the current status (e.g., valid, revoked, expired, etc.) and may govern itself accordingly.

In step 320, after the buyer receives the attestation(s), and the attestation(s) are verified to be valid (i.e., not revoked), the buyer may complete its onboarding process knowing that the supplier is who the supplier purports to be1. The buyer may use the information in the attestation(s) to expedite parts of any onboarding identity verification process.

For example, when the employee of the supplier shares the attestations needed for onboarding with the buyer, the distributed ledger and the attestation's chain of trust are what classify the attestation as valid or revoked. The buyer does not need to validate anything.

In one embodiment, supplier information may be retrieved from ERP systems to auto-populate supplier information in the buyer's systems.

Figure 4:
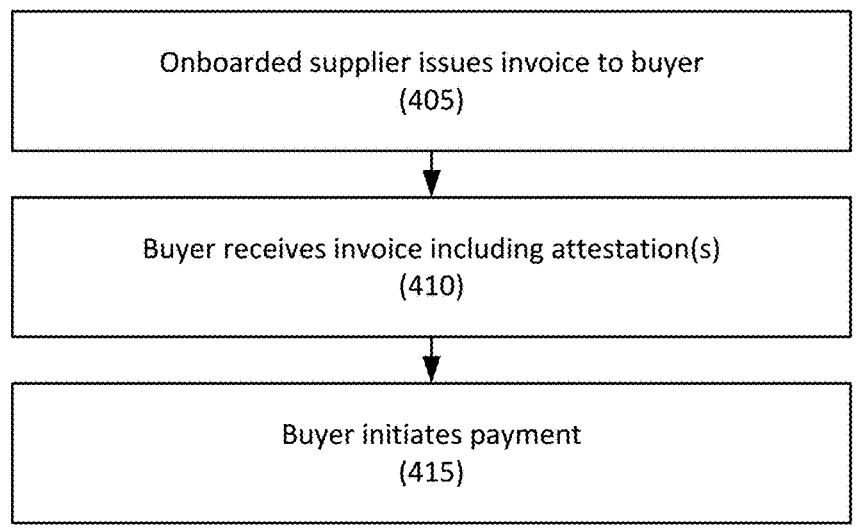
FIG. 4 illustrates a method for invoice signing according to one embodiment.

Referring to FIG. 4, a method of invoice signing is provided according to an embodiment. In one embodiment, an on-boarded supplier may want to issue an invoice to a buyer so it can be paid.

In step 405, a supplier employee who may have an authorized invoicing attestation or similar may submit and invoice to the payments computer program. The invoicing attestation may attest that the employee is authorized by the supplier to submit invoices on behalf of the supplier and/or to the buyer. In one embodiment, the invoice may include the amount due, a description of the goods or services involved, an invoice identifier, as well as the supplier's attestation(s). In one embodiment, the supplier's employee may sign the invoice with the employee's invoicing attestation.

In one embodiment, only the employee from the supplier who has the invoicing attestation or similar may submit the invoice. They can use their attestation to sign the invoice document by embedding the invoicing attestation into the invoice document.

In one embodiment, as the supplier completes phases or reaches certain milestones (e.g., 25%, 50%, 75%, 100%), the buyer may issue a completion progress attestation to the supplier. The supplier may include the completion progress attestation with the invoice.

In step 410, the buyer receives the invoice and attestations. In one embodiment, the buyer may receive these at a portal provided by the payments computer program, on a mobile application in communication with the payments computer program, etc.

In one embodiment, the payments computer program may verify the attestations for the buyer.

In step 415, the buyer may initiate payment for the invoice or the completed portion thereof. In one embodiment, the buyer may offer different payment types (e.g., ACH, card, cryptocurrency, stablecoin, etc.) to the buyer, and may default to the most advantageous mechanism.

In one embodiment, if the buyer is a financial institution, the financial institution may provide incentives for a supplier to have an account with the financial institution and to receive payment at that account.

Figure 5:
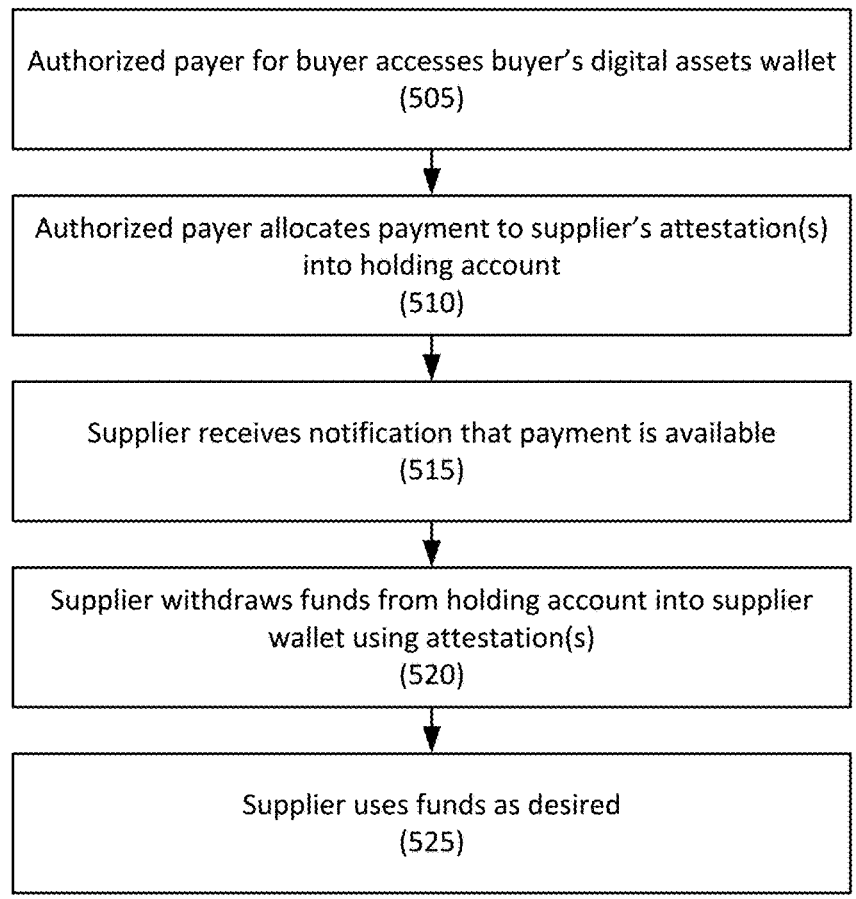
FIG. 5 illustrates a method for buyer payment according to one embodiment.

Referring to FIG. 5, a method for buyer payment is provided according to one embodiment. In step 505, an employee at the buyer may have or may claim an authorized payer attestation or similar. The authorized payer attestation may provide the employee with access to the buyer's digital assets wallet. For example, Employee A may have an authorized payer attestation that allows Employee A to access to buyer funds to make payments to X number of suppliers on behalf of the buyer.

In step 510, the authorized payer may allocate the amount due to the supplier's holding account. In one embodiment, the authorized payer does not need to know the supplier's account details, but instead associates the payment with the supplier's attestation. In one embodiment, the buyer may pay with a digital stable coin or by any suitable manner.

In one embodiment, the distributed ledger may provide transparency. The attestations may be tracked and stored in wallets, and the supplier may use a private key to sign attestation and may push the signed attestation to the buyer via the network.

In one embodiment, the buyer may use cryptocurrency (e.g., ERC20 tokens) and may use smart contracts to determine logic of amount, time, and entitled supplier.

In one embodiment, the buyer may send authorized payments to a shared liquidity pool, and, in response to receiving an attestation from a supplier, the payments program may allow the supplier to withdraw the amount owned from the shared pool.

In step 515, the suppler may receive a notification that payment has been made. In one embodiment, the supplier may log back into the payment program website, mobile application, etc. and will notified that the invoice amount has been allocated to them from the buyer. In one embodiment, appropriate attestation(s) may be required to access this information.

The supplier may use its private key to unlock funds and retrieve back to chosen account.

In step 520, the supplier may withdraw funds from a holding account using the supplier's attestation. In one embodiment, the payments program may use the supplier's attestation to identify the amount due and may make that available to the supplier. The amount due may be determined based on the invoice amount as well as the time of withdrawal. For example, if the supplier withdraws payment early, the amount may be dynamically discounted. Thus, a supplier may only be able to withdraw $98 instead of $100.

In one embodiment, the supplier withdrawing the funds may be required to be the same supplier that was onboarded and authenticated, including the same employee, or a similarly attested employee. In another embodiment, the account the supplier is withdrawing the funds into may be required to be the account set up. This provides additional security to both the buyer and the supplier.

In step 525, the supplier may use the funds as desired. In one embodiment, the supplier may keep the funds in the supplier's digital wallet and may use the funds for payments it may have, such as to its suppliers.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for invoicing and payments in an integrated supplier network, comprising:

receiving, at a supplier interface for a payments computer program and from a supplier, an invoicing attestation for an employee of the supplier, a supplier attestation for the supplier, and an invoice for an amount due, wherein the invoicing attestation is issued by an identity provider and comprises a chain of trust that attests that the identity provider is authorized to issue the invoicing attestation and attests that the employee of the supplier is authorized to submit invoices for the supplier, and the supplier attestation comprises a legal entity identifier for the supplier or a certificate of incorporation for the supplier that is issued by the identity provider and comprises a chain of trust that attests that the identity provider is authorized to issue the invoicing attestation for the supplier, wherein the invoicing attestation is nested within an identity provider attestation and the supplier attestation is nested within the identity provider attestation;

receiving, from a buyer and at a buyer interface for the payments computer program, an authorized payer attestation that is issued by the identity provider and comprises a chain of trust that attests that the identity provider is authorized to issue the authorized payer attestation and attests that a payer for the buyer is authorized to issue payments for the buyer, wherein the authorized payer attestation is nested within the identity provider attestation;

verifying, by the payments computer program and via a portal provided by the identity provider, that the invoicing attestation, the supplier attestation, and the authorized payer attestation have not been revoked, wherein the identity provider verifies that the chain of trust for the invoicing attestation, the chain of trust for the supplier attestation, and the chain of trust for the authorized payer attestation are not written as revoked on a distributed ledger;

granting, by the payments computer program, access to a buyer account for the buyer to the payer based on the authorized payer attestation;

receiving, by the payments computer program, a payment allocation for the amount due from the invoice from the buyer account;

associating, by the payments computer program, the payment allocation with the supplier attestation;

transferring, by the payments computer program, funds for the payment allocation from the buyer account to a liquidity pool, wherein the funds are commingled with other funds in the liquidity pool;

receiving, at the supplier interface, the supplier attestation, and a request to withdraw at least a portion of the funds for the payment allocation; and retrieving, by the payments computer program, the portion of the payment allocation to a supplier account with the integrated supplier network.

2. The method of claim 1, wherein the payment allocation is signed with an authorized payer attestation for an employee of the buyer.

3. The method of claim 1, wherein the invoice further comprises a completion progress attestation issued by the buyer to the supplier.

4. The method of claim 3, wherein the completion progress attestation identifies completion progress by the supplier.

5. The method of claim 3, further comprising:
   determining, by the payments computer program, a dynamic discount amount for the portion of the funds for the payment allocation, wherein the dynamic discount amount is based on a timing of the retrieval by the supplier.

6. The method of claim 1, wherein the supplier account with the integrated supplier network comprises a digital wallet.

7. The method of claim 1, wherein the funds are provided in ERC20 tokens.

8. The method of claim 1, wherein the payment allocation is based on an amount of the invoice and a timing of the retrieval of the portion of the funds for the payment allocation.

* * * * *